Jan. 30, 1940.  R. J. BURROWS ET AL  2,188,496
AIR CONDITIONING MEANS FOR RAIL CARS
Filed Jan. 24, 1938   2 Sheets-Sheet 2

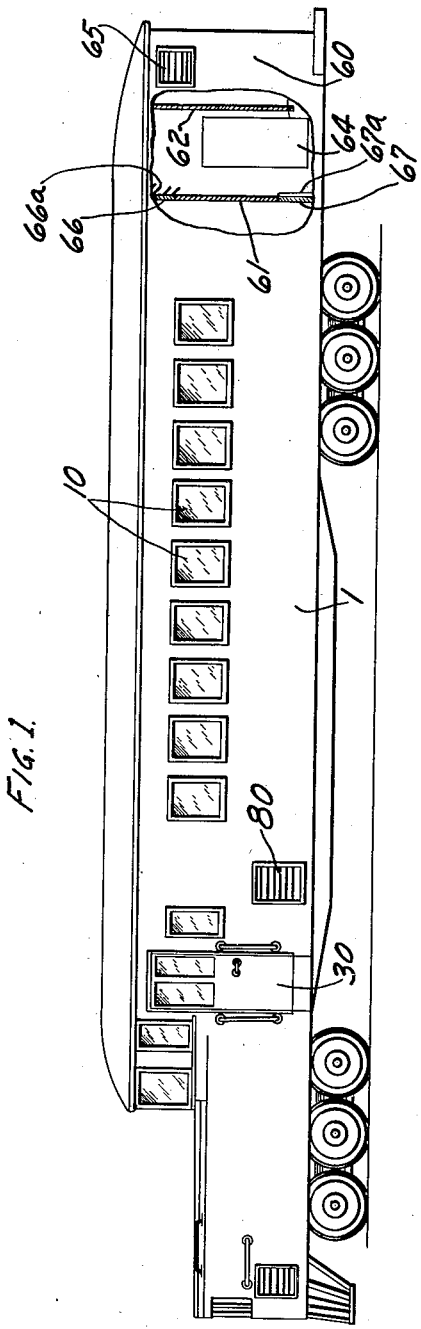
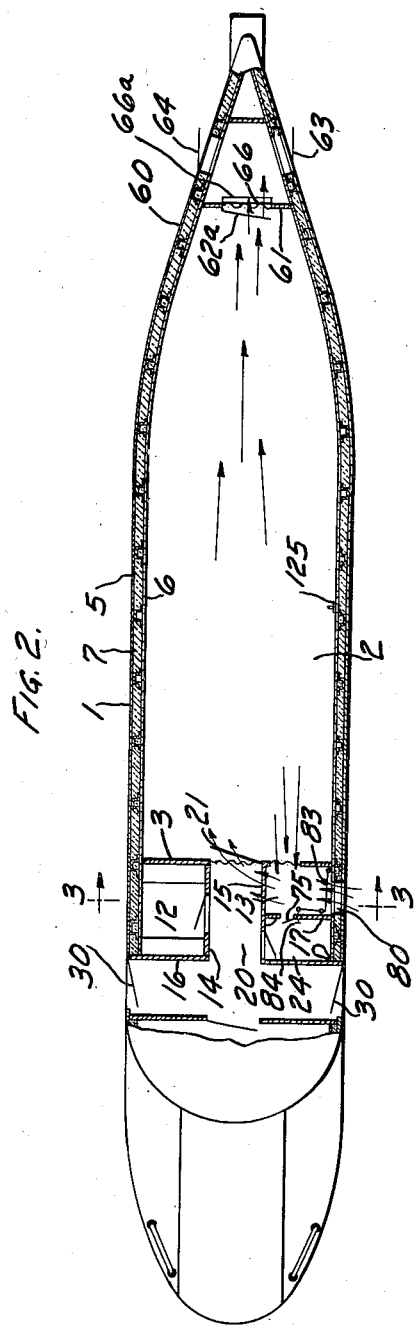

INVENTORS:
ROBERT J. BURROWS
ALFRED O. WILLIAMS

BY Walter E. Schirmer
ATTY.

Patented Jan. 30, 1940

2,188,496

UNITED STATES PATENT OFFICE 2,188,496

AIR CONDITIONING MEANS FOR RAIL CARS

Robert J. Burrows and Alfred O. Williams, Battle Creek, Mich., assignors to Clark Equipment Company, Battle Creek, Mich., a corporation of Michigan Application January 24, 1938, Serial No. 186,616

5 Claims. (Cl. 98—10)

The present invention relates generally to rail cars and the like adapted particularly for passenger traffic and is especially concerned with the provision of air conditioning means arranged for a motor driven rail car of the light weight type, although our invention is not to be necessarily limited to this type of equipment.

The present application is a continuation in part of our copending application, Serial No. 666,076, filed April 14, 1933.

The principal object of the present invention is the provision of air conditioning means for vehicles which is capable of delivering a substantially constant amount of properly treated air to the passenger compartments of the car, the extent or degree of treatment of the air, such as heating, cooling and the like, being governed by means responsive to such conditions on the interior of said compartments.

More specifically, one object of the present invention is the provision of an improved heating means for rail cars and the like in which a source of heat, which may be, for example, a radiator or the like, heated from the motor of the rail car, and means for controlling the proportion of air heated by coming into contact with said heat source in accordance with temperature conditions existing within the passenger compartment. Another object of the present invention is the provision of a novel form of control means by which certain proportions of the total volume of air delivered to the car may be shunted around the heat source out of thermal contact therewith so as to thus effectively control the temperature of the air entering the passenger compartment of the car.

Still further, another object of the present invention is the provision of air conditioning means which embodies both heating and cooling means, the proportion of air modified by either of these means being effectively controlled, and particularly is it an object of the present invention to secure such control without varying the total volume of air directed into the passenger compartment.

Another object of the present invention is the provision of air conditioning means in which a portion of the air delivered to the passenger compartment is withdrawn from outside the car while another portion of the air is withdrawn from the interior of the passenger compartment so as to secure a recirculation therein, the amount of recirculation secured being controlled and thereby capable of being adjusted to meet various conditions. For example, the recirculation desired within the passenger compartment may be greater during cold weather in order to secure somewhat greater efficiency for the heating means. Likewise, a substantial amount of recirculation may be desirable during hot weather in which the major treatment of the air may consist in cooling the same. Also, during warmer weather it may be desirable to draw most of the air from outside the car, thereby reducing the extent of recirculation.

In this connection we provide suitable means associated with one of the intakes for preventing direct cross flow of air between the intakes in case of strong lateral winds, thereby insuring a mixing of the air streams within the air conditioning chamber.

These and other objects of the present invention will be apparent from the following detailed description of a specific construction in which the principles of the present invention have preferably been embodied, taken in conjunction with the accompanying drawings, illustrating such embodiment.

In the drawings:

Figure 1 is a side elevation illustrating one type of rail car in which the principles of the present invention have been utilized;

Figure 2 is a horizontal section taken through the passenger compartment of the car shown in Figure 1 and illustrating the operation of the air conditioning means of the present invention;

Figure 3:
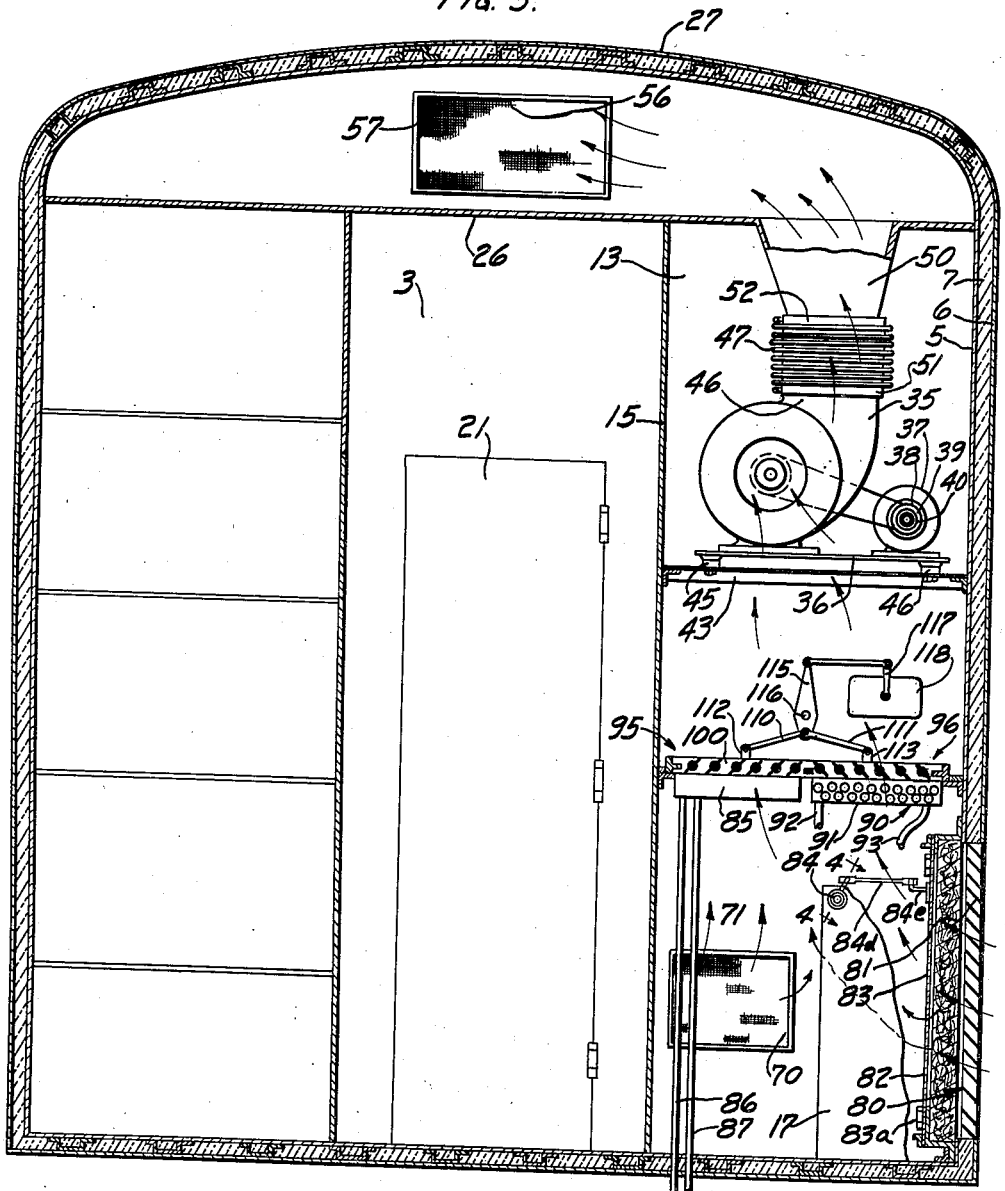
Figure 3 is an enlarged vertical section taken substantially along the line 3—3 of Figure 2.
Figure 4:
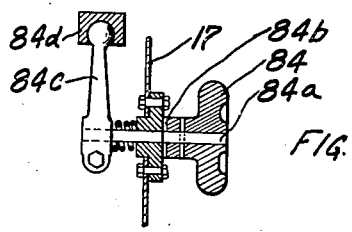
Figure 4 is a section taken along the line 4—4 of Figure 3.

Referring now to the drawings, the body of the rail car is indicated by the reference numeral 1 and, as best shown in Figure 2, the body includes a passenger compartment 2, the forward end of which is closed by means of a transverse bulkhead 3. The car body, particularly the passenger compartment 2 thereof, is in the form of a double walled compartment including an outer wall 5 and an inner wall 6 between which is disposed sound deadening material 7. The passenger compartment 2 is, as is customary, provided with windows 10 and preferably these windows are mounted in the side walls of the passenger compartment in hermetically sealed airtight relation.

Forward of the bulkhead 3 are compartments 12 and 13 formed by longitudinally disposed walls 14 and 15 and transversely disposed walls 16 and 17. As will be noted from Figure 2, the compartments 12 and 13 are disposed on opposite sides of an entrance passageway 20 by which access is had to the passenger compartment 2 through a door 21 in the central portion of the bulkhead 3. Forward of the lefthand compartment 13 is a third compartment 24. The present invention is not particularly concerned with the uses to which the compartments 12 and 24 are put, it being understood that the compartments 12 and 24 may be used for any service desired in connection with the particular type of rail car involved. The compartment 13, however, contains certain parts of the air conditioning system with which the present invention is concerned, as will be described later. The compartments 12, 13 and 24 are preferably closed at the upper portions by a ceiling 26 spaced a short distance below the roof 27 of the car. Access is gained to the entrance passageway 20 from outside the car through doors 30 arranged at either side of the car.

The major portion of the air conditioning apparatus is arranged in the compartment 13 forward of the transverse bulkhead 3. Referring now more particularly to Figure 3, a blower 35 of conventional construction is mounted upon a base 36 which also carries driving means in the form of an electric motor 37 or the equivalent. Preferably, the blower 35 is belt driven and the motor 37 is equipped with a plurality of pulleys 38, 39 and 40 of different diameters to provide for varying or adjusting the speed at which the blower 35 is driven. The blower 35 is supported upon supporting bars in the form of spaced angle irons 43 secured in any manner desired to the walls of the compartment 13. Preferably, the base 36 is connected with the spaced bars 43 by cushioning means in the form of rubber bushings 45 or the equivalent, such bushings serving to prevent the transmission of vibrations from the blower 35 or the motor 37 to the body of the rail car.

The discharge end 46 of the blower is connected by a flexible bellows 47 with one end of a discharge conduit 50. The flexible bellows 47 is secured to the upper end of the blower outlet 46 and to the lower end of the conduit 50 by clamping bands 51 and 52, respectively, the flexible bellows 47 effectively preventing the transmission of any material amount of vibration from the rapidly rotating blower 35 or the motor 37 to the walls of the car body. The upper end of the conduit 50 is secured in a suitably shaped opening in the ceiling 26 forming the top of the compartment 13. A discharge opening 56 is provided in the bulkhead 3 above the door 21 and the ceiling 26 and substantially midway between the side walls of the car, and the air directed into the space above the ceiling 26 by the blower 35 passes rearwardly through the opening 56 directly into the passenger compartment 2. The ceiling 26 and the associated walls therefore form a continuation of the conduit means of which the member 50 forms a part. Preferably, the opening 56 is closed by an ornamental grill 57 or the like.

As indicated in Figure 2, the rear end of the rail car is preferably streamlined by being formed with a tapered tail 60. The rear portion of the passenger compartment 2 is closed by a pair of relatively narrow transverse bulkheads or walls 61 and 62, and the walls 61 may be provided with a door 62a forming, if desired, an emergency exit for the car. In this connection, the rear end of the car body may be provided with emergency doors 63 and 64 at either side thereof. Preferably, also, the rear end of the car is provided with one or more outlets 65, and the wall 61 above the door 62a is provided with an outlet opening 66 which, like the discharge opening 56 in the forward bulkhead 3, is provided with an ornamental grill or the like and is controlled by adjustable shutters 66a. In addition, another opening 67 is provided in the back partition 61 near the floor and on the side of the partition 61, away from the passenger compartment, a check door 67a is provided, being hinged to the partition 61 so as to swing downwardly by gravity against the opening 67 to close the same against any back flow of air into the passenger compartment. The partition 62 is placed back of the doors 63 and 64 and in front of the opening 65 and extends from the roof of the car to within a short distance from the floor. This latter partition acts as a baffle plate and cooperates with the gravity door 67a in preventing any direct flow of air from the rear of the car into the passenger compartment.

The two or more supporting bars 43 which carry the weight of the blower and the motor 37, are spaced apart to allow for the free passage of air therethrough to the blower 35. Disposed below the supporting bars 43 are two inlet openings providing for the entrance of air into the compartment 13 under the suction created by the blower 35. One of the openings is indicated in Figure 3 by the reference numeral 70 and is formed in the lower part of the bulkhead 3 to one side thereof and in the position thereof which forms the rear wall of the compartment 13. Preferably, this inlet opening 70 is also covered by an ornamental grill 71 or the like designed to allow the right amount of recirculating air, which is preferably constant. Access to the air conditioner compartment 13 is had only by means of a door 75 opening into the service compartment 24. If desired, however, the door 75 may be disposed in the wall 15 of the entrance passageway 20.

The other inlet opening is indicated by the reference numeral 80 and is formed in one side of the car body. Preferably, this opening is provided with an ornamental grill or with louvres 81. In addition, this opening may also be provided with any desired form of air screening or cleaning means, and such is indicated by the reference numeral 82 in Figure 3. Preferably, the air cleaner 82 is disposed in the compartment 13 and can be removed therefrom for the purpose of cleaning the same or for purposes of replacement. A hinged door 83 is provided for the opening 80 and is preferably formed of a plate or sheet reenforced with angles and hinged along its rear edge, as at 83a. This door is held closed or in any partially opened position by a ratchet knob 84 on the partition 17 pinned onto a shaft 84a and provided with ratchet teeth 84b. The shaft carries an arm 84c connected by a link 84d with a bracket 84e mounted on the door 83.

Reference has been made above to means for conditioning the air which is directed into the passenger compartment by the blower 35 and associated conduit means. In the preferred form of construction, the air conditioning means is in the form of heating and/or cooling means disposed between the air inlets 70 and 80 and the intake of the blower 35. Referring now more particularly to Figure 3, the reference numeral 85 indicates an auxiliary radiator of the cellular type and is connected by conduits 86 and 87 with the cooling system of the motor of the rail car, where the motor of the rail car is of the water cooled type. As will be understood, the cooling means of the motor, heated by the operation thereof, will be circulated through the conduits 86 and 87 and the radiator 85, thereby warming the air which comes into thermal contact with the radiator 85.

The cooling means is indicated by the reference numeral 90 and preferably takes the form of a refrigerator unit 91 of conventional construction communicating by conduits 92 and 93 with any form of refrigerating apparatus which can be carried by the car and operated either by the power of the motor thereof or by any independent source of power available. The heating and cooling means 85 and 90 are supported in position by means of structural members, such as angles or the like as clearly shown in Figure 3, the flange portion of the supporting members closing the space about the edges of the tempering means so that air moving upwardly through the compartment must pass through the tempering means.

The degree of heat or the amount of chilling imparted to the air directed into the passenger compartment is controlled, as will be apparent, by the proportions of the air which moves into thermal relation with respect to the heating unit 85 and the cooling unit 90. According to the present invention, means for governing the relative amounts of air thus treated is provided, and preferably this means takes the form of two sets of pivoted vanes 95 and 96. The vanes 95 and 96 are mounted upon a suitable framework 100 supported within the compartment 13, which framework may also be utilized for supporting the radiator 85. The vanes 95 are mounted just above the radiator 85 and control the amount of air passing through the radiator. The vanes 96 are disposed just above the cooling unit 90, which unit may also be supported by the aforesaid framework.

The sets of vanes 95 and 96 are interconnected to be simultaneously operated so as to vary the effect of the heating means and the cooling means and the air passing therethrough. The individual vanes are pivotally mounted in the framework 100 and are adapted to be moved from open to closed position. As one feature of the present invention, it is contemplated that the vanes of the two sets shall be so interconnected that when one set is entirely closed, the other set is entirely opened, and the vanes of each set can be moved from open to closed position and to any intermediate point. Further, the sets are so interconnected that they serve as means by which it is possible, if desired, to divert all of the air flow through either of the units 85 or 90 and to control the proportion of air which passes in thermal relation with both of said units. Since pivoted vanes are employed to secure the above-mentioned result, the vanes 95 are arranged at substantially 90 degrees with respect to the vanes 96, and this relation is maintained in any adjusted position of the sets. By virtue of this construction, therefore, the total volume of air flow remains substantially constant while the effect of the respective heating and cooling means can be optionally varied to subject the air flow, as a whole, to any desired temperature within the range provided for by the particular heating and cooling units employed.

From the above, it will thus be observed that the air drawn in through the inlet openings 70 and 80 can follow two paths, one through the radiator 85 and the other through the cooling unit 90 and that the position of the vanes 95 and 96 effectively controls the proportion of air which is caused to flow along each of the paths while the total flow along both paths remains substantially the same.

Reference has been made above to the provision of a cooling unit 90. The provision of such a unit may not be necessary in all cases, and particularly it may not be necessary where the car is operated during periods when the outside temperature is not excessively high. In such cases, therefore, the cooling unit 90 may be entirely eliminated, but in this case the operation of the air conditioning system as a whole is not materially changed, the air directed into the passenger compartment 2 reaching the air blower 35 by means of two paths, one leading into thermal relation with the heating unit 85 and the other shunting or passing around the heating unit out of thermal contact therewith, the proportion of air passing along these two paths being, as before, entirely controlled by the position of the interconnected vanes 95 and 96.

As another important feature of the present invention, it is contemplated that the position of the controlling vanes 95 and 96 shall be governed by means which is responsive to some characteristic existing within the passenger compartment 2. Where the units 85 and 90 are heating and cooling units, or where only a heating or only a cooling unit is employed with the air proportionately shunted around the unit, the control means for governing the position of the vanes 95 and 96 is preferably means responsive to the temperature within the passenger compartment 2. Any conventional or well known means may be employed for this purpose. For example, the sets of vanes 95 and 96 may be interconnected by means of links 110 and 111 connected, respectively, to lugs 112 and 113, the latter being operatively associated with the sets of vanes so that shifting the lugs will adjust the vanes. At the inner or adjacent ends the links 110 and 111 are connected with a shiftable member 115 in the form of a lever pivoted, as at 116, to a stationary part in the compartment 13. The upper end of the shiftable lever 115 is link connected with an arm 117 forming a part of an operating mechanism 118 carried in the compartment 13. The mechanism 118 is under the control of a temperature responsive unit 125 (see Figure 2) disposed in the passenger compartment 2, preferably in the coldest section thereof, any form of connections being provided between the unit 125 and the mechanism 118. Since the present invention is not particularly concerned with the details per se of the temperature responsive mechanism, and since such operating mechanisms are available in the open market, such details have not been illustrated. It is sufficient to note that the arm 117 is actuated by the mechanism 118 to position the vanes 95 and 96 in a given definite position, according to the temperature at the unit 125.

In this connection it is to be noted that the temparature unit 125 is representative of any form of responsive means sensitive to the characteristic in the passenger compartment which the air modifying means in the compartment 13 is adapted to adjust or vary. Naturally, where either heating means or cooling means or both, are disposed in the path of the air directed into the passenger compartment, the unit 125 is a temperature responsive unit, but it is to be understood that the present invention is not to be necessarily limited to temperature varying means as the air conditioning mechanism with which the rail car of the present invention is to be equipped.

The operation of the above described structure is believed to be apparent. The blower 35 is preferably driven at a constant rate, this rate being capable of adjustment to meet various conditions by virtue of the multi-faced pulley by which the motor 37 drives the blower. Since the windows of the passenger compartment are substantially air tight, the blower 35 is in operation at all times whenever the car is in use. The air discharged by the blower 35 is directed above the ceiling 26 and out through the discharge outlet 56 into the passenger compartment. In one construction it was found that 600 cubic feet per minute proved quite satisfactory in operation. Some of the air in the passenger compartment is recirculated by being drawn in through the inlet opening 70 and some of the air escapes through the outlets or openings 66 and 67. In the above-mentioned embodiment, it was found that if the openings 66 and 67 were provided so as to provide for the escape of approximately 300 cubic feet per minute of air, the opening 70 being arranged to provide this rate, satisfactory conditions were obtained. Means for varying the effective size of the opening 70 may be provided if desired. The amount of air circulated depends, as will be obvious, upon the setting of the door 83. This setting of the door 83 may also be used to determine the amount of fresh air drawn in through the fresh air inlet 80 in the side of the car, or, by closing the door 83 completely, the car may be warmed up quickly, using only recirculated air until the desired temperature is reached. It is to be noted that the position of the door 83 is such as to prevent any direct cross circulation between the inlet 70 and the inlet 80. This is especially effective in cases where a strong lateral wind might cause short-circuiting of the air conditioning chamber if no such baffling means were provided. It is also to be pointed out that a certain portion of the air from the inlet 80 impinging against the door 83 will be caused to flow about the free vertical edge of the door as well as over the top edge thereof, and consequently will set up eddy currents whereby a thorough mixing of the fresh and return air is assured as the stream moves upwardly through the conditioning means. All air drawn in through the openings 70 and 80 must pass upwardly in the compartment 13 by the air modifying means 85 and 90 and between the supporting bars 43 to the intake of the blower 35. As mentioned above, the refrigerating unit is not essential unless the car is used in warm weather, and it is also possible that under certain conditions the heating unit 85 might be entirely dispensed with and only a refrigerating cooling unit employed. For ordinary operation in temperate climates, it is probable that the provision of only one unit, the heaing unit such as the one indicated at 85 in Figure 3, would be sufficient. In any case, the air can be considered as drawn to the blower 35 along two more or less parallel paths, the amount of air flowing along each path being determined by the setting of the vanes 95 and 96. As described above, these vanes are so adjusted that more or less of the air is diverted from one path to another to provide the proper control for the conditioning means while maintaining substantially a constant volume of air directed into the car. It will be apparent that when one set of the vanes 95 or 96 is closed the other set will be open. Consequently, all of the air from both inlets must pass through this one set, and consequently will be thoroughly mixed in so doing so that there will be little or no stratification of the fresh and return air currents. The angular position of the door 83 will also determine to a considerable extent the amount of mixing of the air, since the component direction of air impinging against this door due to its angular relationship to the opening will cause diverse movement, especially of the fresh air stream which will set up eddy currents within the chamber such as to produce a mixing of the air.

Where the car is propelled by an internal combustion engine employing a water cooling system, the heating unit 85, if one is employed, is preferably connected with the cooling system of the motor so as to utilize the surplus heat thereof. Obviously, of course, other heat sources may be employed for example, electrical units, chemical units, and the like.

In all cases, the position of the vanes 95 and 96 is under the entire control of the sensitive unit 125.

While we have described above the preferred structure in which the principles of the present invention may be embodied, it is to be understood that our invention is not to be limited to the specific details shown and described, but that, in fact, widely different means may be employed in the practice of the broader aspects of our invention.

What we claim, therefore, and desire to secure by Letters Patent is:

1. In a railroad car having a passenger space, a vertically extending air conditioning compartment at one end thereof of generally rectangular section, a return air inlet from said passenger space to the lower end of said compartment through one side wall thereof, a fresh air inlet into the lower end of said compartment through an adjacent side wall thereof, air tempering means extending across said compartment above said inlets, a blower in said compartment above said tempering means adapted to draw air through said inlets and upwardly through said tempering means and to discharge the same into said passenger space, and a vertically extending door member in the lower end of said compartment hinged at one edge adjacent the intersection of said two side walls for horizontal swinging movement, said door member preventing direct cross flow of air between said inlets.

2. The combination of claim 1 further characterized in the provision of means for securing said door in any desired fixed position between said inlets.

3. In a railroad car having a passenger space, an air conditioning compartment at one end thereof having a generally rectangular section, inlet means in adjacent side walls of said compartment communicating respectively with said passenger space and the exterior of said car, supporting means above said inlets within said compartment, laterally disposed heating and cooling means on said supporting means, a blower disposed thereabove for drawing air through said inlets and upwardly through said heating and cooling means and discharging the same into said passenger space, said supporting means preventing passage of air around said heating and cooling means, and a door hinged vertically adjacent the intersection of said two sidewalls and swinging horizontally to proportion the flow of air into said compartment, said door preventing direct cross flow of air between said inlets.

4. The combination of claim 3 further characterized in the provision of conjointly controlled louvres above said heating and cooling means, and thermally responsive means between said louvres and said blower for controlling the relative position of said louvres to control the passage of air selectively through said heating or cooling means.

5. In a railroad car having a passenger space, a vertically extending air conditioning compartment at one end thereof of generally rectangular section, a return air inlet from said passenger space into the lower end of said compartment through one side wall thereof, a fresh air inlet into the lower end of said compartment through an adjacent side wall thereof, air tempering means extending across said compartment above said inlets, a blower in said compartment above said tempering means adapted to draw air through said inlets and upwardly through said tempering means and to discharge the same into said passenger space, a vertically extending door member in the lower end of said compartment hinged at one edge adjacent the intersection of said two side walls for horizontal swinging movement, said door movement preventing direct cross flow of air between said inlets, and means adjacent said tempering means for restricting and selectively directing the flow of air therethrough.

ROBERT J. BURROWS.
ALFRED O. WILLIAMS.